United States Patent
Ueda et al.

(10) Patent No.: US 8,978,301 B2
(45) Date of Patent: Mar. 17, 2015

(54) OPENING/CLOSING APPARATUS WITH LOCK

(75) Inventors: Shinji Ueda, Hyogo (JP); Shusaku Torihara, Hyogo (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 14/003,402

(22) PCT Filed: Feb. 15, 2012

(86) PCT No.: PCT/JP2012/000983
§ 371 (c)(1),
(2), (4) Date: Sep. 5, 2013

(87) PCT Pub. No.: WO2012/120790
PCT Pub. Date: Sep. 13, 2012

(65) Prior Publication Data
US 2013/0340346 A1    Dec. 26, 2013

(30) Foreign Application Priority Data

Mar. 9, 2011    (JP) .................................. 2011-051775

(51) Int. Cl.
*E05C 7/06* (2006.01)
*E05F 15/14* (2006.01)
*E05B 83/36* (2014.01)
(Continued)

(52) U.S. Cl.
CPC ............... *E05F 15/14* (2013.01); *E05B 83/363* (2013.01); *E05B 47/00* (2013.01); *B61D 19/009* (2013.01); *B61D 19/02* (2013.01); *E05B 83/40* (2013.01); *E05B 65/0829* (2013.01); *E05B 81/08* (2013.01);
(Continued)

(58) Field of Classification Search
USPC ............ 49/116, 118, 122; 292/121, 127, 219, 292/227, 144, 201 X, DIG. 256, DIG. 46, 57, 292/58, 60, 61, 63, 64
See application file for complete search history.

(56) References Cited

U.S. PATENT DOCUMENTS 4,087,939 A * 5/1978 Elguindy et al. ................. 49/118
4,142,326 A * 3/1979 Schmitz ........................... 49/118
(Continued)

FOREIGN PATENT DOCUMENTS

JP    2003-097124    4/2003
JP    2003-97124 A   4/2003
(Continued)

OTHER PUBLICATIONS

English Translation of International Preliminary Report on Patentability dated Sep. 10, 2013 for PCT/2012/000983 (5 pages).

*Primary Examiner* — Jerry Redman
(74) *Attorney, Agent, or Firm* — Fitch Even Tabin & Flannery LLP

(57) ABSTRACT

Provided is an opening/closing apparatus with a lock capable of performing the opening/closing and closed lock of a sliding door by a single actuator and arbitrarily setting the timing of a lock operation. In the opening/closing apparatus with a lock, an electric motor is driven and the drive force of the electric motor is input to the sun gear of a planetary gear mechanism and output from the internal gear or the carrier. A pair of sliding doors are opened and closed by the drive force output from the internal gear. While the pair of sliding doors are at a fully closed position, the lock and lock-released states of a lock mechanism are switched by a lock restricting mechanism.

11 Claims, 9 Drawing Sheets

(51) Int. Cl.
*E05B 47/00* (2006.01)
*B61D 19/00* (2006.01)
*B61D 19/02* (2006.01)
*E05B 83/40* (2014.01)
*E05B 65/08* (2006.01)
*E05B 81/08* (2014.01)

(52) U.S. Cl.
CPC .............. *E05F 15/141* (2013.01); *Y02T 30/30* (2013.01); *E05Y 2900/51* (2013.01)
USPC ............................... 49/122; 49/118; 292/201

(56) References Cited

U.S. PATENT DOCUMENTS

| | | | | |
|---|---|---|---|---|
| 4,882,876 A * | 11/1989 | Daugirdas | ........................ | 49/141 |
| 5,483,769 A | 1/1996 | Zweili | | |
| 5,893,236 A * | 4/1999 | Krbec et al. | .................... | 49/118 |
| 6,032,416 A * | 3/2000 | Springer et al. | ................ | 49/119 |
| 6,134,838 A * | 10/2000 | Reddy | ............................ | 49/362 |
| 6,189,265 B1 * | 2/2001 | Fink | ................................ | 49/118 |
| 6,446,389 B1 * | 9/2002 | Heffner et al. | .................. | 49/280 |
| 6,662,500 B2 * | 12/2003 | Inage | ............................... | 49/116 |
| 6,688,042 B2 * | 2/2004 | Stojc et al. | ....................... | 49/118 |
| 6,708,449 B2 * | 3/2004 | Stojc | ................................ | 49/118 |
| 6,718,694 B2 * | 4/2004 | Stojc et al. | ....................... | 49/362 |
| 6,854,399 B2 * | 2/2005 | Inage | ............................ | 105/341 |
| 6,863,001 B2 * | 3/2005 | Inage | ............................ | 105/341 |
| 7,004,516 B2 * | 2/2006 | Stojc | ............................. | 292/201 |
| 7,971,391 B2 * | 7/2011 | Harie | ............................... | 49/120 |
| 8,136,299 B2 * | 3/2012 | Inage | ................................ | 49/118 |
| 8,448,997 B2 * | 5/2013 | Laliberte et al. | ................. | 292/92 |
| 8,661,731 B2 * | 3/2014 | Lee | ................................ | 49/116 |
| 8,661,732 B2 * | 3/2014 | Kong | .............................. | 49/118 |
| 8,661,733 B2 * | 3/2014 | Lee | ................................ | 49/118 |
| 2001/0013200 A1 * | 8/2001 | Fink | ................................ | 49/120 |
| 2002/0184823 A1 * | 12/2002 | Heffner et al. | .................. | 49/280 |
| 2002/0194783 A1 * | 12/2002 | Stojc et al. | ...................... | 49/118 |
| 2002/0194784 A1 * | 12/2002 | Stojc et al. | ...................... | 49/118 |
| 2002/0194785 A1 * | 12/2002 | Stojc | ............................... | 49/118 |
| 2003/0126797 A1 * | 7/2003 | Inage | .............................. | 49/118 |
| 2006/0174540 A1 * | 8/2006 | Oberleitner | .................... | 49/118 |
| 2010/0276945 A1 * | 11/2010 | Pritz et al. | ....................... | 292/57 |

FOREIGN PATENT DOCUMENTS

| | | |
|---|---|---|
| JP | 2008-121244 | 5/2008 |
| JP | 2008-121244 A | 5/2008 |
| WO | 2008/056620 A1 | 5/2008 |

\* cited by examiner

OPENING/CLOSING APPARATUS WITH LOCK

CROSS-REFERENCE TO RELATED APPLICATIONS

This application is a U.S. National Stage application filed under 35 U.S.C. §371 of International Application PCT/JP2012/000983, filed 15 Feb. 2012, which claims priority under the Paris Convention to German Application No. 2011-051775, filed 9 Mar. 2011, the entire contents of each of these applications being incorporated herein by reference.

TECHNICAL FIELD

The present invention relates to an opening/closing apparatus with lock for slide-apart type sliding doors.

BACKGROUND

Conventionally, an opening/closing apparatus with lock, enabling opening and closing movements of sliding doors and locking of the sliding doors in a fully closed position, mounted on a housing in a reciprocatingly movable manner, is known.

For example, Japanese Patent Application Publication No. 2008-121244 (the "Patent Literature 1") discloses an opening/closing apparatus with lock with a simple and compact arrangement that enables secure locking of slide-apart type sliding doors and enables opening and closing and closed locking of the sliding doors with a single actuator.

The opening/closing apparatus with lock disclosed in the Patent Literature 1 includes: a rack and pinion mechanism, having a pair of racks, respectively mounted on a pair of slide-apart type sliding doors that are movable reciprocatingly with respect to a housing, and a pinion engaged with the pair of racks; an actuator, functioning as an opening/closing drive source of the sliding doors; a locking mechanism mounted on the housing and enabling to lock the pair of sliding doors in a fully closed position by constraining respective movements of locking members that are respectively fixed to the respective sliding doors of the pair of sliding doors; a switching mechanism for switching the locking mechanism between a locked state and an unlocked state; and a planetary gear mechanism, having an input portion, into which a drive force of the actuator is input, a first output portion, enabling to output the drive force to the pinion, and a second output portion, enabling to output the drive force to the switching mechanism; and when the sliding doors are in the fully closed position, the drive force is output from the second output portion to the switching mechanism.

RELEVANT REFERENCES

Patent Literature

Patent Literature 1: Japanese Patent Application Publication No. 2008-121244.

SUMMARY OF THE INVENTION

Problems to be Solved by the Invention

As noted above, the opening/closing apparatus with lock of the Patent Literature 1 enables opening and closing and closed locking of the sliding doors with a single actuator.

However, the opening/closing apparatus with lock of the Patent Literature 1 is configured such that the opening and closing and closed locking of the sliding doors are performed in a consecutive operation. Accordingly, in case where the opening/closing apparatus with lock is used as a door opening/closing apparatus for a railway vehicle, the sliding doors are locked in their fully closed positions even if a string of a passenger's luggage such as a bag is left inside the railway vehicle with the string of the bag caught by the sliding doors and the passenger cannot pull out the bag unless the opening/closing apparatus with lock is opened and closed again by a conductor.

The object of the present invention is to provide an opening/closing apparatus with lock capable of performing the opening/closing and closed lock of a sliding door with a single actuator as well as of arbitrarily setting the timing of a lock operation such that a luggage such as a bag can be readily pulled out without sacrificing safety.

Means for Solving the Problem (1) An opening/closing apparatus with lock in accordance with one aspect comprises: a pair of slide-apart type sliding doors movable reciprocatingly with respect to a housing; a pair of opening/closing drive mechanisms each of which is mounted on a corresponding one of the pair of slide-apart type sliding doors; an actuator configured to drive the pair of opening/closing drive mechanisms; one input two output mechanism having an input portion into which a drive force of the actuator is input and a first and second output portions each capable of outputting the drive force; a locking mechanism mounted on the housing, wherein the locking mechanism is configured to lock the pair of sliding doors by constraining respective movements of locking members that are fixed to corresponding one of the pair of sliding doors in response to outputs from the first and second output portions; and a lock restricting mechanism configured to restrict, based on an external signal, switching of the locking mechanism from a lock-released state to a locked state while the pair of sliding doors are at a fully closed position.

In the opening/closing apparatus with lock, when the actuator is driven and the driving force of the actuator is input to the input portion of the one input two output mechanism and output from the first or second output portion. The drive force from the first or second output portion may drive the pair of opening/closing drive mechanisms such that the sliding doors are opened and closed.

Because the lock restricting mechanism restricts switching of the locking mechanism from the lock-released state to the locked state based on an external signal, the sliding doors are not locked even at a fully closed position. The restriction by the lock restricting mechanism is removed based on the external signal, and then the locking mechanism restricts, in response to the output from the first and second output portions, the respective movements of the locking members that are fixed to each one of the pair of sliding doors to lock the pair of the sliding doors.

Thus, the opening/closing and closed lock of the sliding doors can be implemented with a single actuator and the sliding doors are mechanically locked by the locking mechanism, thereby preventing an inadvertent opening of the sliding doors while a railway vehicle is running. Accordingly, the safety is not impaired.

Moreover, because the sliding doors are not automatically locked in the fully closed state, but rather the timing to lock the sliding doors in the fully closed state may be adjusted in accordance with the external signal, the sliding doors may be forced open until the sliding doors are in the locked state and a luggage such as a bag that are caught by the sliding doors may be readily pulled out.

(2) In the opening/closing apparatus with lock, the one input two output mechanism may comprise a planetary gear mechanism. The lock restricting mechanism may include a lock restriction drive unit driven by an external signal. The lock restriction drive unit may include a lock restriction drive force transmission mechanism configured to restrict drive force allocation from the planetary gear mechanism to the locking mechanism while the pair of the sliding doors are in the fully closed state.

According to this aspect, the lock restriction drive force transmission mechanism of the lock restriction drive unit may mechanically restrict drive force allocation from the planetary gear mechanism to the locking mechanism while the pair of the sliding doors are in the fully closed state, thereby increasing the reliability.

(3) In one aspect of the opening/closing apparatus with lock, the lock restriction drive force transmission mechanism may comprise a coupling unit configured to be coupled with a planetary gear career of the planetary gear mechanism and extend in a direction of opening width of the planetary gear mechanism; and a lock restricting plate configured to be driven by the lock restriction drive unit, wherein the lock restricting plate may engage with the coupling unit; and wherein the lock restriction drive unit may be disposed along the direction of opening width of the planetary gear mechanism.

According to this aspect, because the coupling unit and the lock restriction drive unit may be disposed along the direction of opening width of the planetary gear mechanism, the direction along the housing of the sliding doors agrees with the direction of opening width of the planetary gear mechanism, thereby readily arranging the lock restriction drive unit including the coupling unit and the lock restricting plate.

(4) In one aspect of the opening/closing apparatus with lock, the lock restriction drive force transmission mechanism and the lock restriction drive unit may be integrally disposed.

According to this aspect, because the lock restriction drive force transmission mechanism and the lock restriction drive unit may be integrally disposed, precise positioning of the lock restriction drive force transmission mechanism and the lock restriction drive unit is not necessary, thereby readily arranging the opening/closing apparatus with lock into a railway vehicle.

(5) In one aspect of the opening/closing apparatus with lock, the lock restricting plate may have, at its one end, a horizontal axis orthogonal to an opening/closing direction of the pair of sliding doors and may have, at its another end, a cylindrical member with its central axis extending in a horizontal direction orthogonal to the opening/closing direction of the pair of sliding doors, the lock restricting plate being rotatable around the horizontal axis; and a coupling unit of the lock restriction drive force transmission mechanism may be, at its one end, coupled with the planetary gear career, and may have, at its another end, a nail member that abuts the cylindrical member of the lock restricting plate. The nail member may be formed such that it prevents the cylindrical member from rotating.

According to this aspect, because the nail member may be formed such that it prevents the cylindrical member from rotating, the lock restriction may be securely maintained. That is, inadvertent removal of the lock restriction may be prevented.

(6) In one aspect of the opening/closing apparatus with lock, the external signal may be a speed signal that may be output from a vehicle in accordance with a speed of the vehicle.

According to this aspect, a lock operation may be restricted to permit to open and close the sliding doors while the vehicle is running at a certain low speed, whereas the lock restriction may be removed to lock the sliding doors when the speed of the vehicle exceeds the certain low speed. As a result, a bag and other thing caught by the sliding doors may be pulled out for a longer time while the train is running at a certain speed that does not compromise safety.

(7) In one aspect of the opening/closing apparatus with lock, the lock restricting mechanism may be configured to restrict switching from the lock-released state to the locked state until a predetermine amount of time has lapsed, instead of using the external signal.

According to this aspect, the outfitting process may be readily performed without the need of additional signal lines from the vehicle.

LIST OF REFERENCE NUMBERS

Figure 1:
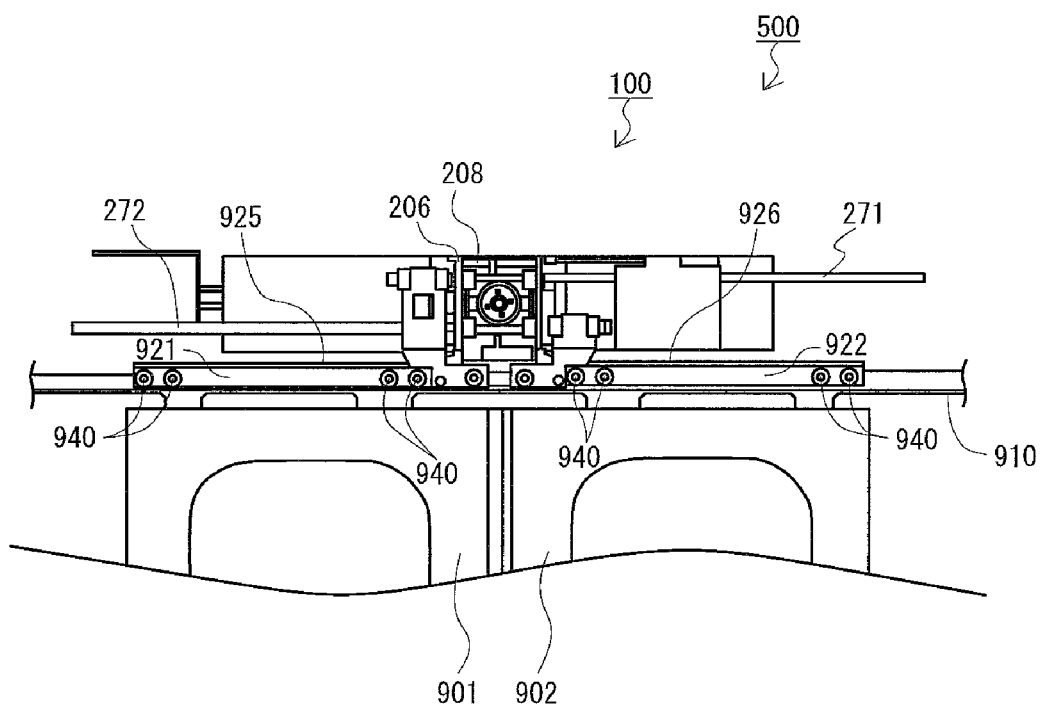
FIG. 1 is a schematic front view of one example of an opening/closing apparatus with lock that is installed in a railway vehicle opening/closing door.

100: opening/closing apparatus with lock
231, 232: locking pin
300: planetary gear mechanism
301: electric motor
310: sun gear
330: internal gear
340: career
390: engagement axis
500: vehicle opening/closing door
600: locking mechanism
700: lock restricting mechanism
710: solenoid
720: lock restricting plate
722: axis
723: cylindrical member
730: lock restricting unit
731: engaging unit
740: first transmission member
750: second transmission member
800: control unit
901,902: a pair of sliding doors

DESCRIPTION OF EXAMPLE EMBODIMENTS

Embodiments according to the invention will now be described below with reference to the drawings. Described herein is an opening/closing apparatus with lock in accordance with the invention that are applied to a railway vehicle.

FIG. 1 is a schematic front view of one example of an opening/closing apparatus with lock 100 that is installed in a vehicle opening/closing door 500.

Arrangement of Railway Vehicle Opening/Closing Door

The vehicle opening/closing door 500, shown in FIG. 1, may be configured as a door enabling to open and close an opening formed in a side wall of a vehicle such as a railway vehicle. The vehicle opening/closing door 500 may have a pair of slide-apart type left and right sliding doors 901 and 902. The pair of sliding doors 901 and 902 may be disposed reciprocatingly movable along a guide rail 910 installed horizontally above the opening.

As shown in FIG. 1, hangers 921 and 922 may be fixed to respective upper edges of the sliding doors 901 and 902, and a plurality of door rollers 940 may be axially supported in a rotatable manner in each of the hangers 921 and 922. Each door roller 940 may be configured to roll along the guide rail 910.

The vehicle opening/closing door 500 may be configured to be locked by the opening/closing apparatus with lock 100 according to one embodiment of the present invention at a given timing after the sliding doors 901 and 902 become in a closed state. It is dangerous for the vehicle opening/closing door 500 of a railway vehicle or other vehicle to become open while the vehicle is running and it is required to securely lock such a door so as not to become open inadvertently during running.

Opening/Closing Apparatus with Lock

Figure 2:
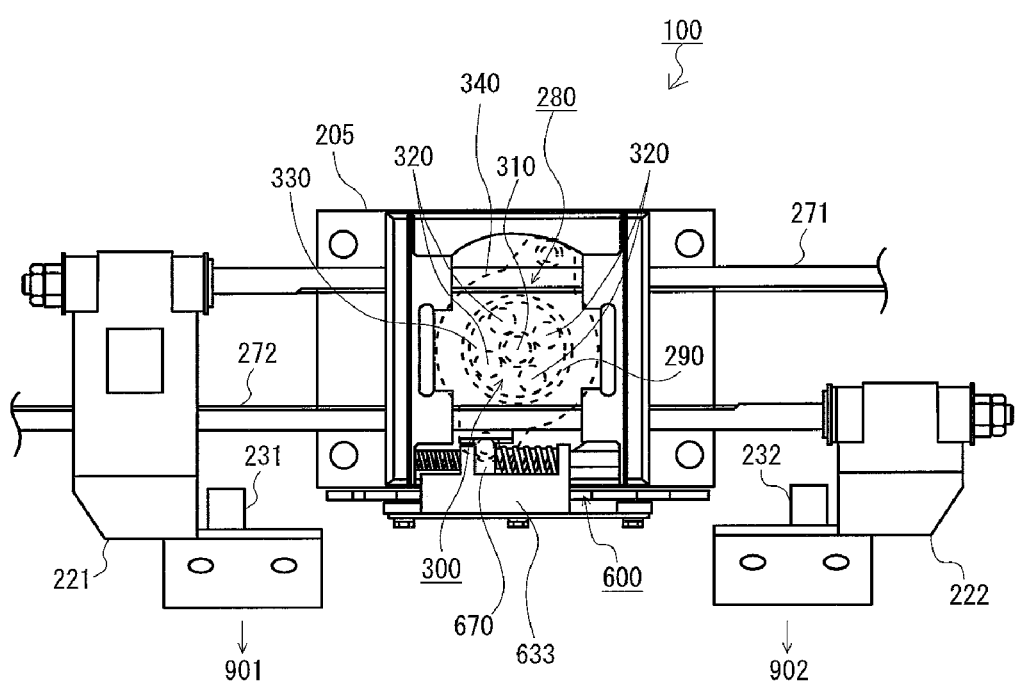
FIG. 2 is a schematic front view of an arrangement of the opening/closing apparatus with lock in an unlocked state.
Figure 3:
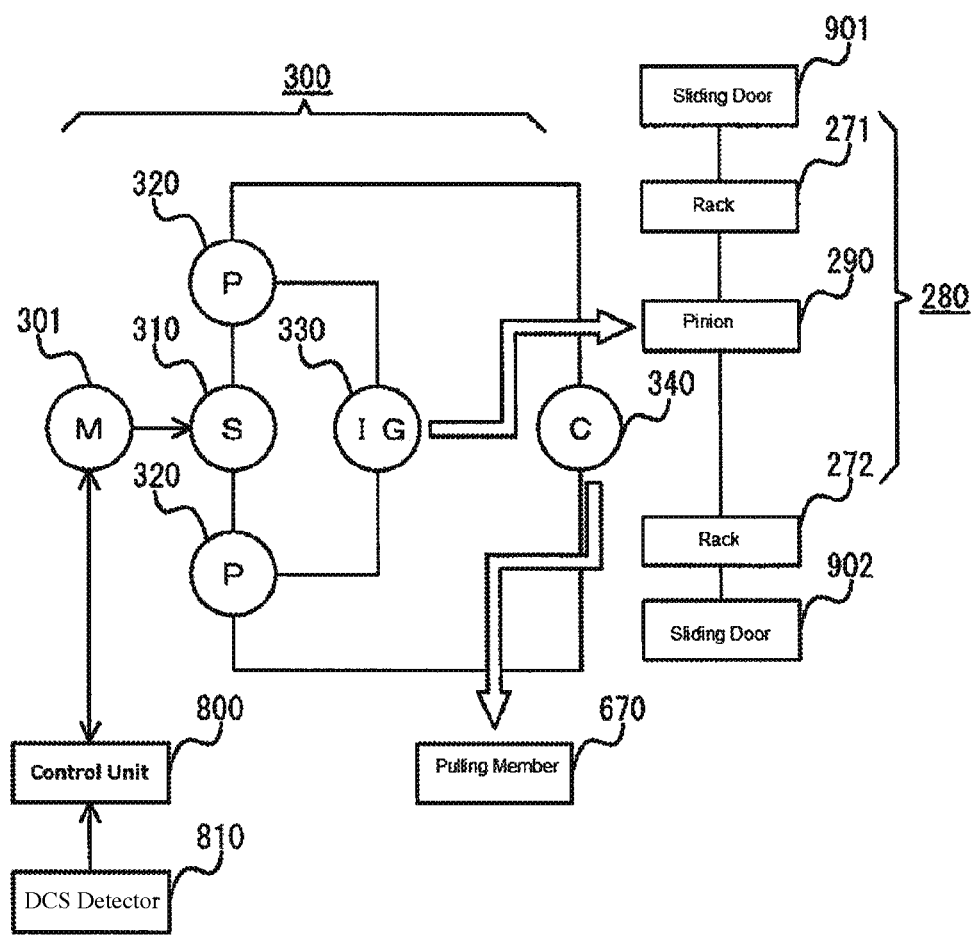
FIG. 3 is a schematic front view of an explanatory diagram for explaining a power transmission in a planetary gear mechanism and a rack and pinion mechanism

Now, the opening/closing apparatus with lock 100 will be described in more detail below. FIG. 2 is a schematic front view of an arrangement of the opening/closing apparatus with lock 100 in an unlocked state, and FIG. 3 is a schematic front view of an explanatory diagram for explaining a power transmission in a planetary gear mechanism 300 and a rack and pinion mechanism 280.

As shown in FIG. 2, a plate-like base 205 may be affixed to an upper portion (upper space of the opening) of the side wall (housing) of the vehicle, and two racks 271 and 272 are supported in a rack support 206 fixed to the base 205.

The racks 271 and 272 may be disposed with longitudinal directions thereof being aligned horizontally (parallel to the guide rail 910 of FIG. 1), and are slidably supported by slide supports 208 (see FIG. 1) in the longitudinal directions (horizontal directions).

The two racks 271 and 272 may be disposed parallel to each other with an appropriate vertical interval such that the teeth thereof face each other. A pinion 290 may be rotatably disposed so as to be engaged simultaneously to the teeth of both of the two racks 271 and 272. The pinion 290 may be disposed at a position, which is a central position in a left/right direction above the opening of vehicle opening/closing door 500 and is a position that is sandwiched from above and below by the two racks 271 and 272.

Arm members 221 and 222 may be respectively installed at one ends of the two racks 271 and 272. The arm members 221 and 222 may be respectively fixed to the hangers 921 and 922 via coupling members 925 and 926 (see FIG. 1). The racks 271 and 272 may be coupled to the sliding doors 901 and 902 at their respective one ends via the arm members 221 and 222, respectively.

A rack and pinion mechanism 280 may be constituted of the racks 271 and 272 and the pinion 290, and the two sliding doors 901 and 902 may be driven to open and close by the rack and pinion mechanism 280.

The rack and pinion mechanism 280 may couple the left and right sliding doors 901 and 902 by engaging the plurality of racks 271 and 272 to the single pinion 290 so that the sliding doors 901 and 902 may be symmetrically opened and closed.

As shown in FIG. 2, locking pins 231 and 232 (engaging member with locking mechanism 600), extending vertically upward, may be respectively fixed to the pair of arm members 221 and 222. The movement of the pair of sliding doors 901 and 902 may be locked by constraining the locking pins 231 and 232 with a locking mechanism 600. The locking mechanism 600 will be further described later.

The planetary gear mechanism 300 may be supported on the base 205, as shown in FIGS. 2 and 3. The planetary gear mechanism 300 may have a sun gear 310 (input portion), axially supported in a rotatable manner, planetary gears 320, disposed in plurality at an outer circumference of the sun gear 310 and enabled to undergo rotation and revolution while being engaged with the sun gear 310, an internal gear 330 (first output portion), having internal teeth engaging with the planetary gears 320 at an outer side of the planetary gears 320, and a carrier 340 (second output portion), rotatably supporting the planetary gears 320. The three components of the sun gear 310, the internal gear 330, and the carrier 340 may be positioned along the same rotational axial line and are disposed so as to be respectively rotatable relative to each other. The rotational axial line of these three components is also matched with the pinion axial line of the rack and pinion mechanism 280.

Coupled to the sun gear 310 is the output shaft of a direct drive type electric motor (actuator) 301 rotatable forward and in reverse. The coupling may be achieved via a suitable speed reducing mechanism.

A control unit 800 may be configured to control the electric motor 301 based on a signal either from DCS (Door Closed Switch) detecting unit 810 or the electric motor 301. The detailed operation of the control unit 800 will be described in more detail later.

The internal gear 330 may be coupled with the pinion 290 of the rack and pinion mechanism 280. Furthermore, the carrier 340 may be coupled to a pulling member 670 (see FIG. 4) for pulling the locking mechanism 600, i.e., a locking slider 633 (switching member, see FIG. 4), for switching the locking mechanism 600 between a locked state and an unlocked state.

Locking Mechanism

Figure 4:
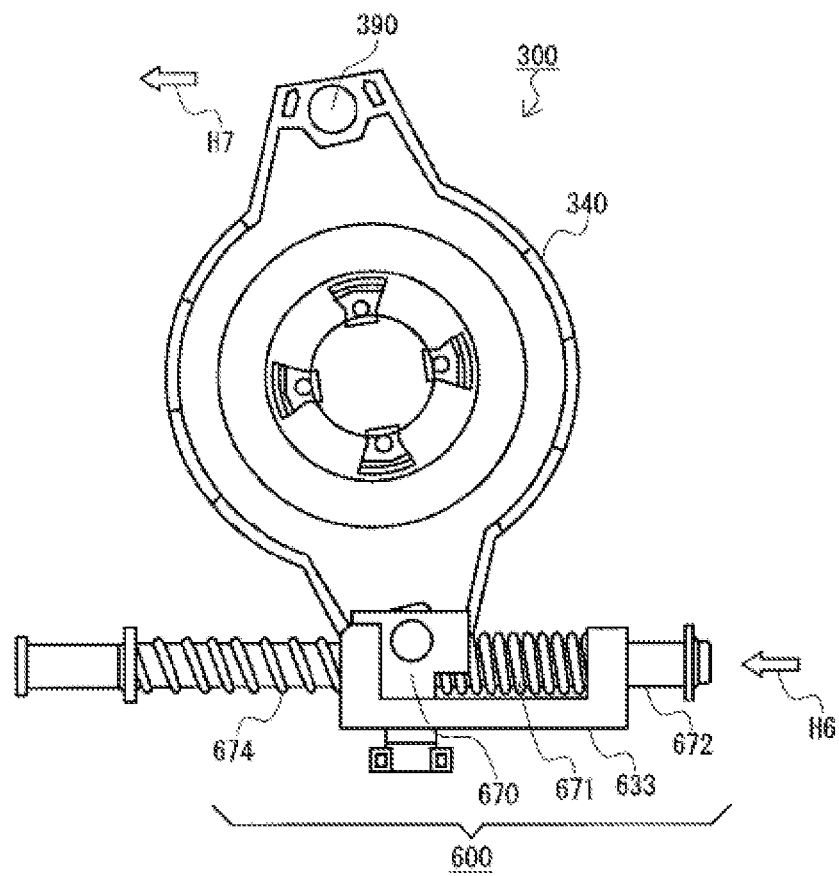
FIG. 4 is a schematic view for explaining one example of a locking mechanism.
Figure 5:
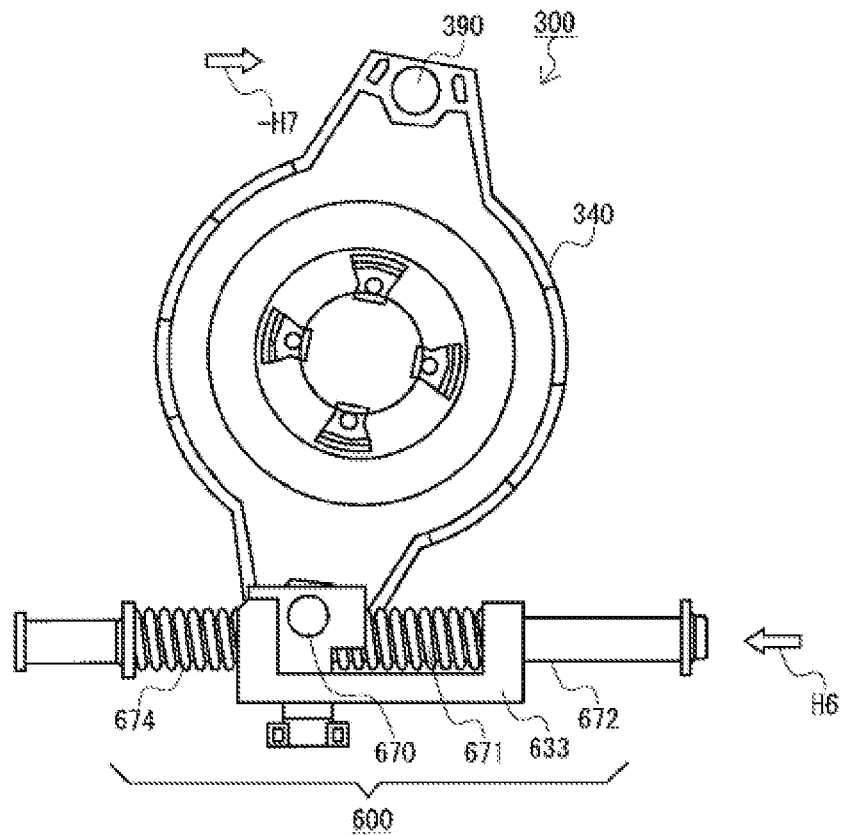
FIG. 5 is a schematic view for explaining one example of a locking mechanism.

Next, the locking mechanism 600 will be described. FIGS. 4 and 5 are schematic views for explaining one example of the locking mechanism 600.

First with reference to FIG. 4, the pulling member 670 and the locking slider 633 may be installed reciprocatingly movable along the direction represented by Arrow H6 and along a guide shaft 672. The guide shaft 672 may extend in parallel with the racks 271 and 272 that may be fixed with respect to the base 205. The pulling member 670 and the locking slider 633 may constitute a switching mechanism for switching the locking mechanism.

Disposed between the pulling member 670 and the locking slider 633 is a torque limiting spring 671 (elastic member) of coil spring form. The torque limiting spring 671 may exert an elastic force on the pulling member 670 and the locking slider 633 so as to push the pulling member 670 against the locking slider 633. Thus, the torque limiting spring 671 may be disposed so as to suppress relative movement of the pulling member 670 with respect to the locking slider 633.

In addition, a locking spring 674 may be disposed on the shaft guide 672 along the direction represented by Arrow H6 so as to bias the locking slider 633 in the locking direction. The locking spring 674 may suppress the locking slider 633 at the locked position from returning to the unlocked position.

The pulling member 670 may be coupled with the career 340 of the planetary gear mechanism 300 so as to be movable, in accordance with the rotation of the career 340 of the planetary gear mechanism 300 in the same direction as or the opposite direction to Arrow H6.

Formed at the upper end of the career 340 of the planetary gear mechanism 300 is a engagement axis 390 which may be securely engaged with a second transmission member 750 of a lock restricting mechanism 700 (described later).

As shown in FIG. 4, when the locking slider 633 moves in the direction opposite to Arrow H6, the second transmission member 750 of the lock restricting mechanism 700 may move in the direction of Arrow 7, and when the locking slider 633 moves in the direction of Arrow H6, the second transmission member 750 of the lock restricting mechanism 700 may move in the direction opposite to Arrow 7. These movements will be further descried later.

Lock Restricting Mechanism

Figure 6:
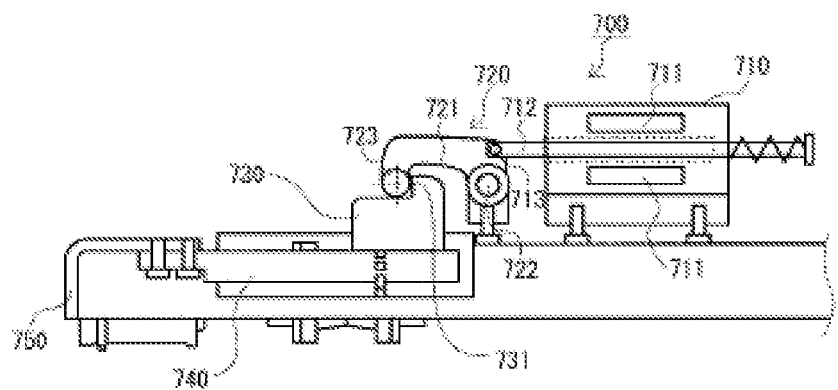
FIG. 6 is a schematic view for explaining one example of a lock restricting apparatus.
Figure 7:
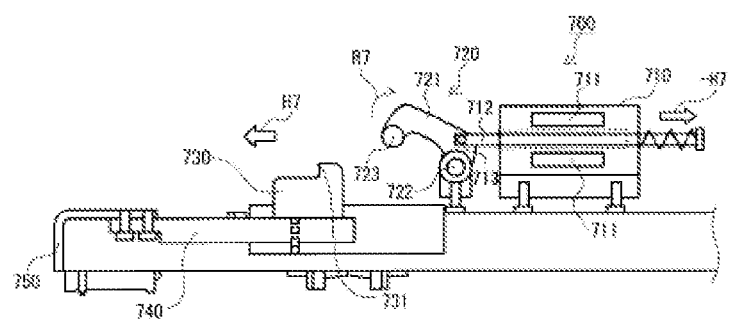
FIG. 7 is a schematic view for explaining one example of a lock restricting apparatus.

Next, the lock restricting mechanism 700 will be described. FIGS. 6 and 7 are schematic views for explaining one example of the lock restricting mechanism 700.

As shown in FIG. 6, in the lock restricting mechanism 700, the leading edge 713 of the solenoid 710 may be axially supported near the axis 722 of a lock restricting plate 720. A cylindrical member 723 of the lock restricting plate 720 may be securely engaged with an engaging unit 731 of the lock restricting unit 730 and a first and second transmission members 740 and 750 may be disposed on the lower portion of the lock restricting unit 730. The engaging unit 731 may be engaged with the cylindrical member 723 on its outer surface above the cross sectional center axis of the cylindrical member 723. As a result, the cylindrical member 723 is prevented from being inadvertently unlocked from the engaging unit 731. The lock restriction unit 730 and the first and second transmission members 740 and 750 may be movable as a unit. The cylindrical member 723 may be pivotable around its axis, thereby preventing the cylindrical member 723 from being inadvertently unlocked from the engaging unit 731 while the removal of the lock restriction may be readily performed.

As shown in FIG. 7, for example, turning off the coil 711 of the solenoid 710 may cause the iron core 712 of the solenoid 710 to move in the direction of Arrow H7. As a result, the leading edge of the iron core 712 may cause the lock restricting plate 720 to rotate around the axis 722 in the direction of Arrow R7. The cylindrical member 723 of the lock restricting plate may then depart from the engaging unit 731 of the lock restricting unit 730 such that the lock restricting unit 730 moves in the direction of Arrow H7. As a result, the first and second transmission members 740 and 750 may move in the direction of Arrow 7 and, as shown in FIG. 5, the locking slider 633 may move in the direction opposite to Arrow H6.

While the solenoid 710 is configured to be activated with a current in the above embodiment, it may be possible to use a different type of solenoid which is activated when a current supply is stopped.

Operation of the Lock Restriction Mechanism

Figure 8:
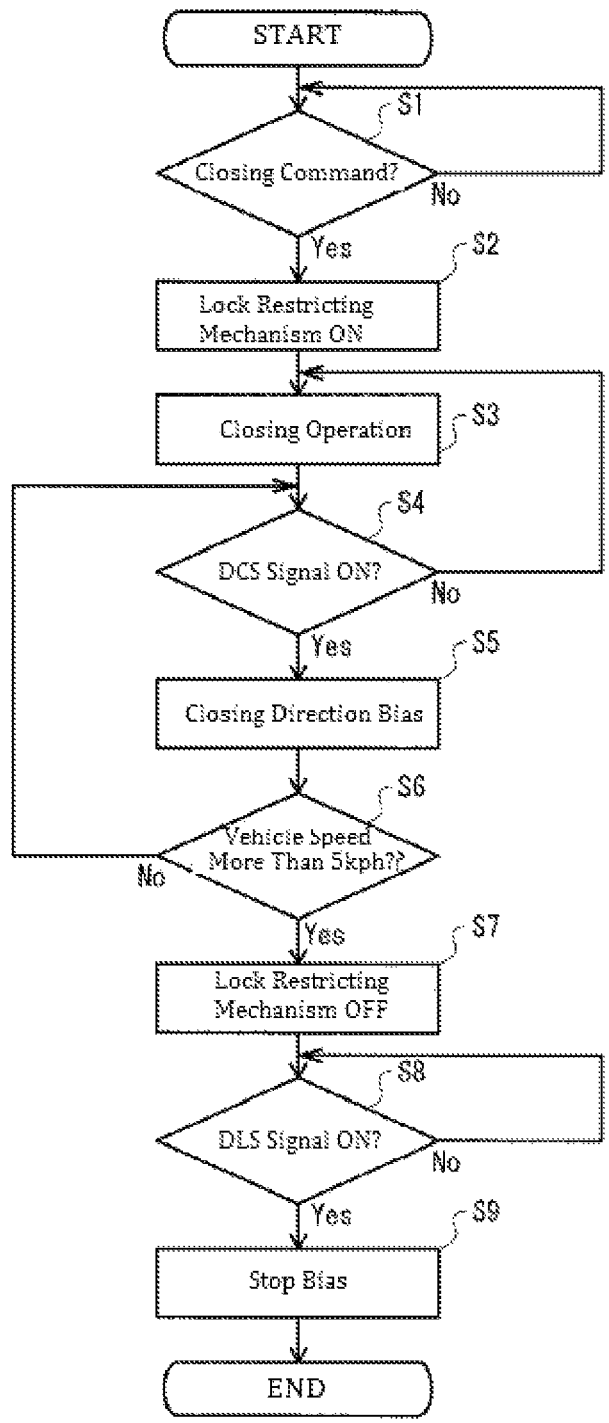
FIG. 8 is a flowchart for explaining operations of a controller.

Next, with reference to the drawings, some operations of the opening/closing apparatus with lock 100 and control unit 800 will be described. FIG. 8 is a flowchart for explaining one example of the operation of the control unit 800.

First, an embodiment where the sliding doors 901 and 902 are initially in an open state. The control unit 800 maintains the open state until a command for a closing operation (Step S1), and, upon receipt of the command for the closing operation, the lock restricting mechanism 700 is turned on (Step S2). That is, as shown in FIG. 6, the solenoid is turned on to fixedly engage the lock restricting plate 720 with the cylindrical member 723. Then, the direct drive type electric motor (actuator) 301 is driven to move the sliding doors 901 and 902 in the closing direction (Step S3).

In this case, the drive force is transmitted from the electric motor 301 to the sun gear 310, from the internal gear 330 to the rack and pinion mechanism 280 so as to move the sliding doors 901 and 902 in the closing direction.

It should be noted that the present invention is not limited to the lock restricting mechanism 700 described in the above embodiment which is configured to be turned on upon receipt of the command for the closing operation, but may include those that may be configured to be turned on at any given timing during the start of the closing operation and the completion thereof when the sliding doors (or doors) 901 and 902 reach the fully closed position.

Next, the control unit 800 determines whether the door closed switch signal (hereinafter, the "DCS signal") is turned on or not (Step S4). If the control unit 800 has determined that the DCS signal has not been turned on, then the processes from Step S3 are repeated. That is, the closing operation continues until the sliding doors 901 and 902 reach the fully closed position.

Even if it is determined that the DCS signal has been turned on, the control unit 800 drives the electric motor 301 to continue to bias the sliding doors 901 and 902 in the closing direction (Step S5).

At this moment, the sliding doors 901 and 902 are in the closed state but yet to be locked by the locking mechanism 600 because the lock restricting mechanism remains turned on.

Accordingly, the inadvertent opening of the sliding doors 901 and 902 can be prevented by biasing them in the closing direction by the electric motor 301.

Next, the control unit 800 determines whether the vehicle speed is greater than, for example, 5 kph or not (Step S6). If the vehicle speed is determined to be less than 5 kph, then the control unit 800 repeats the processes from Step S4 until the vehicle speed becomes greater than 5 kph.

If the sliding doors 901 and 902 are opened in order to pull out, for example, the thread of a bag caught therebetween before the vehicle speed reaches 5 kph, the DCS signal is turned off and the closing operation is performed.

On the other hand, if the vehicle speed is determined to be greater than 5 kph, then the control unit 800 turns the lock restricting mechanism 700 off, i.e., the current supply to the solenoid 710 is stopped (Step S7). As a result, the restriction by the lock restricting mechanism 700 is removed (see FIG. 7). That is, the restriction in switching from the lock-released state to the locked state is removed. In this case, the drive force from the sun gear 310 is transmitted from the planetary gears 320 to the pulling member 670 because the internal gear 330 (the first output side) is not allowed to rotate.

As a result, as shown in FIG. 7, the first and second transmission members 740 and 750 of the lock restricting mechanism 700 and the engagement axis 390 becomes movable in the direction of Arrow H7.

The bias in the closing direction by the electric motor 301 causes the locking slider 633 to move in the direction opposite to Arrow H6, as shown in FIG. 4. More particularly, the drive force from the career 340 causes the lower edge of the pulling member 670 to move in the direction opposite to Arrow H6 while the locking mechanism 600 fixes the locking pins 231 and 232 to constrain their movements. As a result, the sliding doors 901 and 902 are locked in the closed state.

After the locking operation has been completed, the bias in the closing direction by the electric motor 301 continues until the door locking switch (DLS) signal is turned on (Step S8).

Thus, the bias in the closing direction by the electric motor 301 can prevent the sliding doors 901 and 902 from inadvertently becoming open. In addition, the bias can prevent such an inadvertent opening of the sliding doors 901 and 902 even in case that a mechanical lock system is inoperable due to, for example, malfunction of the locking mechanism 600.

If the DLS signal is turned on, the control unit turns the motor power off to stop the bias in the closing direction Step S9). Under this circumstance, the lock by the locking mechanism 600 is maintained so as to prevent the sliding doors 901 and 902 from being unlocked and becoming open while the vehicle is running.

By keeping the motor power turned off, power consumption, while the railway vehicle is running, can be reduced. In addition, inadvertent opening operations can be prevented while the vehicle is running even in case of malfunction of the control unit 800.

Although, in the lock restricting mechanism 700 in accordance with the above-described embodiment, the control unit 800 controls lock restriction using the solenoid 710, the present invention is not limited to the embodiment, rather any kind of driving mechanism such as a direct driven type motor including a linear motor and ball screw motor may be used.

Other Examples

Figure 9:
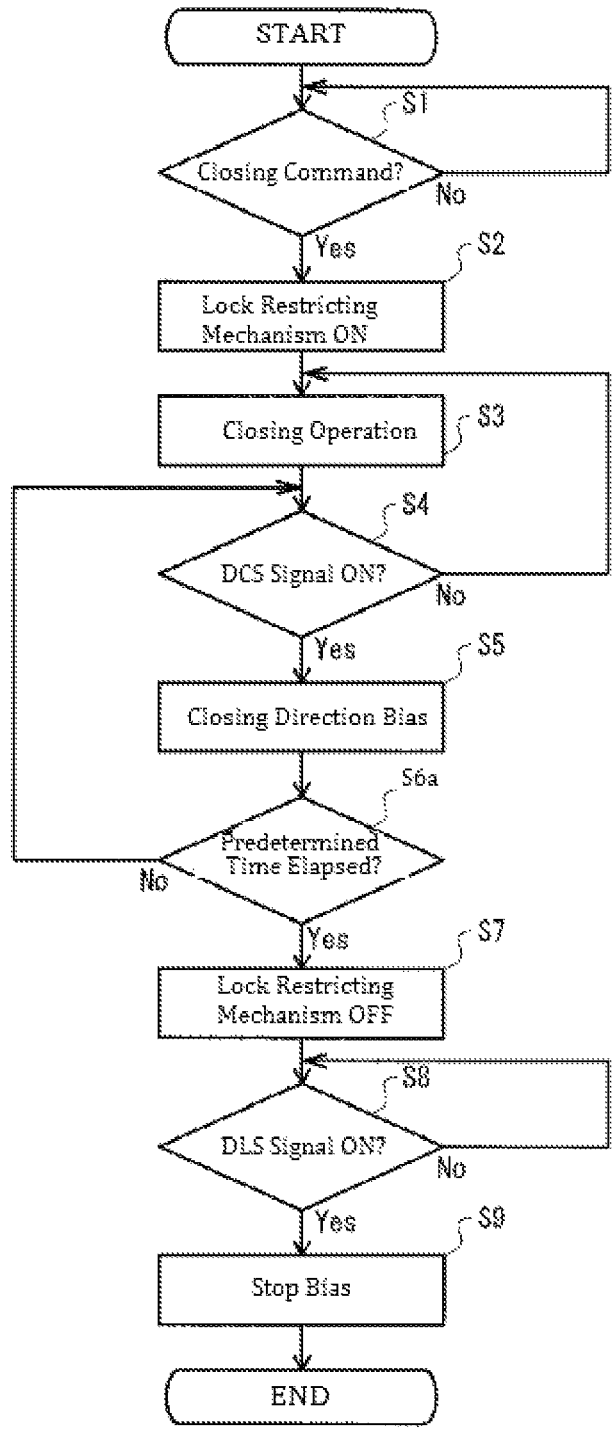
FIG. 9 is a flowchart for explaining other operations of a controller.

FIG. 9 is a flowchart for explaining another example of the operation of the control unit 800 shown in FIG. 8.

The operations of the control unit 800 shown in FIG. 9 are different than those shown in FIG. 8 in that Step S6a is performed in FIG. 9 instead of Step 6 in FIG. 8. The operations of the control unit 800 will be described below with reference to FIG. 9. The description will focus on the operations in FIG. 9 different from those in FIG. 8.

As shown in FIG. 9, the control unit 800 determines whether the door closed switch signal (hereinafter, the "DCS signal") is turned on or not (Step S4). If the control unit 800 has determined that the DCS signal has not been turned on, then the processes from Step S3 are repeated. That is, the closing operation continues until the sliding doors 901 and 902 reach the fully closed position.

Even if it is determined that the DCS signal has been turned on, the control unit 800 drives the electric motor 301 to continue to bias the sliding doors 901 and 902 in the closing direction (Step S5).

At this moment, the sliding doors 901 and 902 are in the closed state but yet to be locked by the locking mechanism 600 because the lock restricting mechanism remains turned on.

Accordingly, the inadvertent opening of the sliding doors 901 and 902 can be prevented by biasing them in the closing direction by the electric motor 301.

Then, the control unit 800 determines whether a predetermined amount of time elapses or not (Step S6a). If the predetermined amount of time has not been elapsed yet, then the control unit 800 repeats the processes from Step S4 until the certain amount of time elapses.

If the sliding doors 901 and 902 are opened in order to pull out, for example, the thread of a bag caught therebetween before the vehicle speed reaches 5 kph, the DCS signal is turned off and the closing operation is performed (Step S3).

On the other hand, if the certain amount of time has been elapsed, then the control unit 800 turns the lock restricting mechanism off, i.e., the current supply to the solenoid 700 is stopped (Step S7). The other operations in the embodiment shown in FIG. 9 is the same as those performed by the control unit as shown in FIG. 8.

The predetermined amount of time may mean the time DCS signal is continuously received in the operation of Step S4. The certain amount of time may be within the range several seconds to several minutes, and, more preferably, may be several ten seconds. The predetermined amount of time may be measured using either a timer built in the control unit 800 or an external timer disposed adjacent to the opening/closing apparatus with lock 100.

Thus, instead of the signal representing the vehicle speed in FIG. 8, as described above with reference to FIG. 9, the lock restriction may be removed based on a signal which is output after the DCS signal is turned on, i.e., after the predetermined amount of time has been elapsed since the sliding doors 901 and 902 become fully closed.

In this embodiment, the timing when the sliding doors 901 and 902 are locked may be uniformed. In addition, by using a timer built in the control unit 800, the outfitting process may be readily performed without the need of additional signal lines from the vehicle.

Even in case of using the external timer disposed adjacent to the opening/closing apparatus with lock 100, a signal can be readily received via a short signal line.

Thus, in the opening/closing apparatus with lock 100 in accordance with this embodiment, the restriction of switching of the locking mechanism from a lock-released state to a locked state and removal thereof may be performed by the lock restricting mechanism 700 based on the speed signals. As a result, because the timing to lock the pair of sliding doors 901 and 902 in the fully closed state may be adjusted in accordance with the speed signal, the sliding doors 901 and 902 may be forced open until the sliding doors are in the locked state and a luggage such as a bag that are caught by the sliding doors may be readily pulled out.

For example, a lock operation may be restricted to permit to open and close the pair of sliding doors 901 and 902 while the vehicle is running at a predetermined speed (low speed), whereas the lock restriction may be removed to lock the pair of sliding doors 901 and 902 when the speed of the vehicle exceeds the predetermined speed (not low speed). As a result, a bag and other thing caught by the pair of sliding doors 901 and 902 may be pulled out for a longer time while the train is running at a certain speed that does not compromise safety.

In addition, it is possible to permit a partial opening of the pair of sliding doors 901 and 902 when the control unit 800 receives from the electric motor 301 a signal representing that the pair of sliding doors 901 and 902 have been moved in the opening direction, wherein the full open is not permitted.

After a certain amount of time has lapsed, the electric motor 301 is driven again to move the pair of sliding doors 901 and 902 in the closing direction.

Furthermore, by the solenoid 710, the lock restricting plate 720, the lock restricting unit 730, and the first and second transmission members 740 and 750, drive force allocation from the planetary gear mechanism to the locking mechanism may be restricted while the pair of the sliding doors are in the fully closed state. As a result, there is no need to use a plurality of electric motors 301 to detect the fully closed state of the pair of the sliding doors 901 and 902. Accordingly, the opening/closing apparatus 100 may be simplified.

In another example, the solenoid 710, the lock restricting plate 720, lock restricting unit 730, and the first and second transmission members 740 and 750 may be integrally configured. In this example, precise positioning is not necessary, thereby allowing an easy outfitting. In yet another example, the outfitting to a vehicle or other thing may be performed along the direction of opening width of the planetary gear mechanism (the direction represented either by Arrow H6 or H7), and the direction agrees with direction along the housing of the pair of sliding doors 901 and 902, whereby an easy outfitting may be achieved.

In the present invention, the opening/closing apparatus with lock 100 may correspond to the recited opening/closing apparatus with lock; the pair of sliding doors 901 and 902 may correspond to the recited sliding doors; the vehicle opening/closing door 500 may correspond to the recited pair of opening/closing drive mechanisms; the electric motor 301 may correspond to the recited actuator; the sun gear may correspond to the recited input portion; the internal gear 330 may correspond to the recited first output portion; the career 340 may correspond to the recited second output portion; the planetary gear mechanism 300 may correspond to the recited one input two output mechanism; the engagement axis 390, the lock restricting unit 730, and the first and second transmission members 740 and 750 may correspond to the recited coupling unit the axis 722 may correspond to the recited horizontal axis; the cylindrical member 723 may correspond to the recited cylindrical member; the engaging unit 731 may correspond to the recited nail member and shape for preventing a movement; the control unit 800 may correspond to the recited control unit; the locking mechanism 600 may correspond to the recited locking mechanism; the solenoid 710 may correspond to the recited lock restriction drive unit; the lock restricting plate 720, the lock restricting unit 730, and the first and second transmission members 740 and 750 may correspond to the recited lock restriction drive force transmission mechanism; the planetary gear mechanism 300 may correspond to the recited planetary gear mechanism; the locking mechanism 600 and the lock pins 231 and 232 may correspond to the recited locking members; and the lock restricting mechanism 700 may correspond to the recited lock restricting mechanism.

The forgoing preferred embodiments of the invention are not intended to limit the invention to the disclosed examples. The disclosed embodiments can be modified as appropriate in various ways unless departing from the spirit of the present invention. It will be understood that are not limited to the aforementioned embodiments, but various changes or modifications may be made to the extent not to depart from the spirit of the invention.

The disclosed operations and advantageous effects of the invention in accordance with the aforementioned embodiment are presented for an explanation purpose of the invention, but not intended to limit the scope of the present invention.

What is claimed is:

1. An opening and closing apparatus with lock, comprising:
    a pair of sliding doors movable reciprocatingly with respect to a housing;
    a rack and pinion mechanism mounted to the pair of sliding doors;
    an actuator configured to drive rack and pinion mechanism;
    a planetary gear mechanism having an input portion into which a drive force of the actuator is input, and first and second output portions each capable of outputting the drive force;
    a locking mechanism mounted on the housing, wherein the locking mechanism is configured to lock the pair of sliding doors by constraining movement of locking members each fixed to corresponding one of the pair of sliding doors in response to outputs from the first and second output portions; and
    a lock restricting mechanism configured to restrict, based on an external signal, switching of the locking mechanism from a lock-released state to a locked state while the pair of sliding doors are at a fully closed position.

2. The opening and closing apparatus with lock of claim 1, wherein the lock restricting mechanism includes a lock restriction drive unit driven by the external signal; and wherein the lock restriction drive unit includes a lock restriction drive force transmission mechanism configured to restrict drive force allocation from the planetary gear mechanism to the locking mechanism while the pair of the sliding doors are in the fully closed state.

3. The opening and closing apparatus with lock of claim 2, wherein the lock restriction drive force transmission mechanism comprises: a coupling unit configured to be coupled with a planetary gear carrier of the planetary gear mechanism and extend in a direction of opening width of the planetary gear mechanism; and a lock restricting plate configured to be driven by the lock restriction drive unit, wherein the lock restricting plate may engage with the coupling unit; and wherein the lock restriction drive unit is disposed along the direction of the opening width direction of the planetary gear mechanism.

4. The opening and closing apparatus with lock of claim 3, wherein the lock restriction drive force transmission mechanism and the lock restriction drive unit are integrally disposed.

5. The opening and closing apparatus with lock of claim 4, wherein the lock restricting plate has, at one end thereof, a horizontal axis orthogonal to an opening and closing direction of the pair of sliding doors and has, at another end thereof, a cylindrical member with a central axis thereof extending in a horizontal direction orthogonal to the opening and closing direction of the pair of sliding doors, the lock restricting plate being rotatable around the horizontal axis;
    wherein a coupling unit of the lock restriction drive force transmission mechanism is, at one end thereof, coupled with the planetary gear career, and has, at another end thereof, a nail member that abuts the cylindrical member of the lock restricting plate; and
    wherein the nail member is formed such that the nail member prevents the cylindrical member from rotating.

6. The opening and closing apparatus with lock of claim 1, wherein the external signal is a speed signal, the speed signal being output from a vehicle on which the opening and closing apparatus with the lock is installed in accordance with a speed of the vehicle.

7. The opening and closing apparatus with lock of claim 1, wherein the lock restricting mechanism is configured to restrict switching from the lock-released state to the locked state until a predetermined amount of time has lapsed, instead of using the external signal.

8. A door opening and closing apparatus for a railway vehicle, the door opening and closing apparatus comprising:
- a pair of sliding doors each having a drive mechanism for sliding of the doors between open and closed positions;
- an actuator operable to drive the sliding doors between the open and the closed positions thereof via the drive mechanisms of the doors;
- a pair of locking members each associated with a corresponding one of the pair of sliding doors;
- a locking mechanism for the pair of sliding doors having an unlocked configuration in which the locking members and the associated sliding door are free to be driven between the open and closed positions thereof and a locked configuration in which the locking members and the associated sliding doors are locked in the closed position;
- a transmission mechanism between the actuator and the drive mechanisms and having a single drive force input member which receives a drive force from the actuator;
- a first drive force output member of the transmission mechanism operatively connected to the drive mechanisms of the sliding doors for transmitting the drive force received by the single drive input member to the drive mechanisms of the sliding doors;
- a second drive force output member of the transmission mechanism operatively connected to the locking mechanism for transmitting the drive force received by the single drive input member to the locking mechanism; and
- a lock restricting mechanism that has a lock restraining state in which the lock restricting mechanism keeps the locking mechanism in the unlocked configuration allowing the first drive force output member to transmit the drive force to the drive mechanisms of the sliding doors, and a lock release state in which, the sliding doors are in the closed position and external signal indicates that a speed of the railway vehicle is greater than a predetermined speed, the second drive force output member transmits the drive force to the locking mechanism to shift the locking mechanism from the unlocked configuration to the locked configuration.

9. The door opening and closing apparatus of claim 8 wherein the transmission mechanism includes a plurality of gear members with a first one of the gear members being the single drive force input member, a second one of the gear members being the first drive force output member, and a third one of the gear members being the second drive force output member, and the lock release mechanism is operable in the lock restraining state to cause the first gear member to drive the second gear member and is operable in the lock release state to cause the first gear member to drive the third gear member.

10. The door opening and closing apparatus of claim 8 wherein the transmission mechanism comprises a planetary gear mechanism, the single drive force input member comprises a sun gear of the planetary gear mechanism, the first drive force output member comprises an internal gear of the planetary gear mechanism, the second drive force output member comprises a carrier of the planetary gear mechanism, the carrier having planetary gears rotatably mounted thereto that are engaged with the internal gear and the sun gear, the drive mechanisms including a rack and pinion mechanism with a pinion gear of the rack and pinion mechanism coupled to the internal gear, and the carrier coupled to the locking mechanism.

11. The door opening and closing apparatus of claim 10 wherein the lock restricting mechanism includes a lock restriction drive unit operable based on the external signal to shift the lock restricting mechanism from the lock restraining state, in which the lock restricting mechanism is operable to cause the drive force to drive the internal gear and the pinion gear coupled thereto, to the lock release state, in which the lock restricting mechanism is operable to cause the drive force to drive the carrier which, in turn, causes the locking mechanism coupled thereto to shift from the unlocked configuration to the locked configuration.

* * * * *